Patented July 28, 1942

2,291,235

UNITED STATES PATENT OFFICE 2,291,235

QUINOLINE DERIVATIVES

Walter Kikuth, Wuppertal-Vohwinkel, Germany, assignor to Winthrop Chemical Company, Inc., New York, N. Y., a corporation of New York No Drawing. Application June 29, 1938, Serial No. 216,471. In Germany July 3, 1937

4 Claims. (Cl. 260—288)

This invention relates to new quinoline derivatives.

U. S. Patent 1,747,531 describes amino quinolines which are basically substituted in their amino group. The said products are distinguished by their action against blood parasites. In particular the 6-methoxy-8-(5'-diethylamino-pentyl-2'-amino)-quinoline has become known as being an effective remedy against malaria. As compared with quinine known as a remedy against malaria, the product mentioned is distinguished by its specific action against the type of malaria parasites (gametes) which propagate sexually.

In accordance with the present invention there are obtained by means of the reactions hereinafter indicated new compounds having a specific action. These new compounds are 6-hydroxy-8-amino-quinolines in which the nuclear 8-amino group is connected with an amino group of aliphatic character by an aliphatic chain of three carbon atoms. By amino groups of aliphatic character such amino groups are understood which in contradistinction to the aromatically bound amino groups behave like aliphatically bound amino groups, that is to say not only the proper aliphatic amines but also saturated heterocyclic amines as well as alicyclically substituted amines. The particular action of the new products obtained according to the invention is that they are very well compatible and do not only show an exterminating action on the gametes but even in a much lower concentration have a selective action on the sexual forms which are in the state of maturity, whereby the capability of flagellation of the male gametocytes is stopped and copulation is prevented, that is to say, sterilisation of the male gametocytes is attained.

8-aminoquinolines with a free hydroxyl group being basically substituted have already been obtained (compare Swiss Patent No. 129,425). The known compounds, however, do not show the above specified action, since this action is due to the fact that the 8-amino group attached to the quinoline nucleus must be connected with an amino group of aliphatic character by three and only three carbon atoms of an aliphatic radical.

In the new compounds the amino group of aliphatic character may be a primary, secondary or tertiary one. Tertiary amino groups may also be members of a heterocyclic ring, for instance, a pyrrolidine or piperidine ring. The aliphatic chain of three carbon atoms serving to connect the amino group of aliphatic character with the nuclearly bound amino group may bear substituents, for instance alkyl- and hydroxyl-groups.

The new products are advantageously employed in the form of their salts with mineral acids or organic acids, for instance, in the form of the hydrochloride, hydrobromide, sulfate, acetate, methane sulfonate, lactate, tartrate and citrate. Despite the constant composition in particular the melting points of the hydrobromides of one and the same substance show uncertain values. As salt-forming acids there may be used, for instance, the methylene-bis-(2'-hydroxynaphthalene-3-carboxylic acid), the methylene-bis-salicylic acid and the like (compare U. S. Patent No. 1,872,826).

The manufacture of the compounds is carried out as indicated in specification No. 1,747,531. For instance, in 8-aminoquinolines, in which an amino group of aliphatic character is connected with the 8-amino group through an aliphatic chain of three carbon atoms, a substituent standing in 6-position and capable of being transformed into the hydroxyl group may be transformed into this latter group. An ether group standing in 6-position, i. e., an alkoxy, aralkoxy- or aryloxy group, may be converted into the hydroxyl group in accordance with the methods known per se, for instance, by treatment with hydrohalic acid or with metal halides, such as aluminium chloride and aluminium bromide. Furthermore, 6-acyloxy groups may be saponified to the hydroxyl groups, or 6-nitro- or 6-amino groups may be transformed in the manner known per se into the hydroxyl group. Radicals, capable of being split off readily, for instance, acyl radicals present in or introduced into the amino groups of the starting materials, are split off simultaneously or are subsequently removed in the usual manner.

The new quinoline compounds may also be obtained by starting with 6-hydroxy-8-amino quinolines and connecting the 8-amino group with an amino group of aliphatic character through an aliphatic chain of three carbon atoms according to the customary working methods. For this purpose, for instance, amines of aliphatic character with a reactive ester group, in which the reactive ester group and the amino group are connected by a chain of three carbon atoms or their salts, are caused to react upon 6-hydroxy-8-amino-quinolines. Alternatively, instead of the reactive esters of the amines, the corresponding amino-alcohols may be condensed with the 6-hydroxy-8-amino-quinolines to the new compounds according to the working methods indicated in the British specification No. 433,625. The amino group of the amino compounds to be used in this reaction may be a primary, secondary or tertiary one, as indicated above, but it may also be substituted by radicals, for instance, acyl radicals which are to be split off subsequently or simultaneously.

The new compounds may further be obtained by causing ammonia or primary or secondary amines of aliphatic character to react upon 6-hydroxy-8-alkylamino quinoline compounds which contain in the alkyl radical a reactive group separated from the 8-amino group by a chain of three carbon atoms. Reactive groups are preferably halogen atoms; also sulfonic acid ester groups and alkylene oxide groups may be exchanged for the amine radical or attached to the amine.

The new compounds may further be obtained by preparing the quinoline compound according to Skraup's method from 1.2-diamino-4-hydroxy-benzenes the 2-amino group of which is connected with an amino group of aliphatic character through a chain of three carbon atoms, which amino group may, if desired, be protected.

The invention is further illustrated by the following examples without being restricted thereto, the parts being by weight:

Example 1.—273 parts of 6-methoxy-8-(4'-dimethylaminobutyl-2'-amino)-quinoline are dissolved in 1500 parts of hydrobromic acid (spec. grav. 1.5). The solution is heated in a steam bath of 120° C. until the splitting off of methyl bromide is complete (about 2 hours). The solution is freed from hydrobromic acid by evaporation under reduced pressure. The dihydrobromide of the 6-hydroxy-8-(4'-dimethylamino-butyl-2'-amino)-quinoline is obtained as a solid residue. When recrystallized from alcohol it forms yellow crystalls. The free base obtained therefrom boils under 1.5 mm. pressure at 220–225° C. in the form of a viscous oil solidifying when cold. From ether the base can be obtained in the form of colorless crystals melting at 105–107° C. The compound oxidizes in the air. The solution of the base in alkalies rapidly assumes dark coloration. The compound is readily soluble in the usual inorganic and organic acids. It forms a difficultly soluble yellow salt with methylene-bis-(2-hydroxylnaphthoic acid).

The same compound is obtained by heating 6-ethoxy-8-(4'-dimethylaminobutyl-2'-amino)-quinoline in benzene with aluminium chloride until a test portion is completely soluble in strong alkali.

The same compound is obtained by heating 6-benzyloxy-8-(4'-dimethylaminobutyl-2'-amino)-quinoline with hydrobromic acid until a test portion is soluble in alkali, or by heating 6-phenoxy-8-(4'-dimethylaminobutyl-2'-amino)-quinoline with aluminium chloride in boiling xylene until a test portion is soluble in strong alkali.

By heating 6-acetoxy-8-(4'-dimethylaminobutyl-2'-amino)-quinoline (a compound which is readily soluble in ether boiling at 195–196° C. under 1 mm. pressure) with normal caustic soda solution on the water bath until the solution is clear, and extracting the solution which has the alkaline reaction of sodium bicarbonate by previous introduction of carbon dioxide, with methylene chloride the same compound is obtained.

Example 2.—30 parts of 6-methoxy-8-(4'-diethylaminobutyl-2'-amino)-quinoline are treated with 150 parts of hydrobromic acid (spec. grav. 1.5) in the manner indicated in Example 1. The base obtained, which is readily oxidizable, boils at 235–240° C. under 1.5 mm. pressure.

The same compound is obtained by heating the starting material with hydroiodic acid (spec. grav. 1.7).

Example 3.—10 parts of 6-methoxy-8-dimethylamino-propyl-amino-quinoline are boiled for one hour with 60 parts of hydrobromic acid (spec. grav. 1.5). The mixture is evaporated under reduced pressure. The residue is redissolved from aqueous alcohol. The dihydrobromide of 6-hydroxy-8-dimethylaminopropylamino-quinoline is obtained in orange colored crystals melting at 230° C.

When starting with 6-methoxy-8-diethylaminopropylamino-quinoline the dihydrobromide of 6-hydroxy-8-diethylaminopropylamino-quinoline melting at 140° C. is obtained.

Example 4.—19 grams of 6-nitro-8-(3'-dimethylamino-2'.2'-dimethyl-propylamino)-quinoline hydrochloride melting at 253° C. are dissolved in a small quantity of hot water and added to a hot solution of 50 grams of stannous chloride in 100 ccs. of concentrated hydrochloric acid. After the reduction is complete the solution is rendered alkaline with alkali while cooling, and extracted with ether. The ethereal solution dried with potassium carbonate is somewhat concentrated and treated with a solution of hydrochloric acid in ether. Thereby the hydrochloride of the 6-amino-compound separates. From alcohol yellow brown crystals melting at 240° C. are obtained.

By diazotizing and boiling the amino compound in the usual manner the 6-hydroxy-8-(3'-dimethylamino-2'.2'-dimethyl-propylamino)-quinoline is obtained. The hydrobromide forms orange red crystals melting at 255° C.

Example 5.—26 grams of 6-methoxy-8-(3'-phthalimido-propylamino)-quinoline-hydrobromide melting at 221° C. are heated to boiling with 100 ccs. of alcohol and 12 ccs. of hydrazine hydrate for half an hour. The alcohol is then evaporated from the reaction mixture. 100 ccs. of hydrobromic acid (spec. grav. 1.5) are added to the residue. The mixture is filtered and the filtrate heated to 120–130° C. until a test portion is soluble in strong alkali. After evaporation to dryness the solution is recrystallized from alcohol. In this manner the 6-hydroxy-8-(3'-aminopropylamino)-quinoline-hydrobromide is obtained in the form of orange red crystals melting at 198° C.

Example 6.—16 parts of 6-hydroxy-8-aminoquinoline are heated with 26 parts of 4-dimethylamino-2-bromobutane-hydrobromide for 8 hours to 130–140° C. After cooling the solution is dissolved in dilute hydrochloric acid and sodium acetate is added until the reaction which is acid to Congo red has disappeared. After repeated extraction with ether the aqueous solution is cleared with animal charcoal and treated with caustic soda solution until the reaction is weakly alkaline. The precipitated base is dissolved with ether. On concentration of the ethereal solution the 6-hydroxy-8-(4'-dimethylamino-butyl-2'-amino)-quinoline separates. It displays the same properties as the product obtained in accordance with the directions given in Example 1.

Example 7.—4.6 parts of sodium are dissolved in 50 parts of 3-dimethylamino-butane-1-ol at 120–130° C. 20 parts of 6-hydroxy-8-acetylamino-quinoline melting at 230° C. are added to the solution. The mixture is heated for 24 hours to 180° C. After cooling the excess 3-dimethylamino-butane-1-ol is blown off with steam and the residue treated with dilute hydrochloric acid and filtered. The further working up takes place as indicated in Example 6. The new compound readily takes a dark coloration when coming in contact with air and is readily soluble in dilute acetic acid and dilute alkali.

The same compound is obtained in accordance with the directions given in Example 1 in a better yield when starting with 6-methoxy-8-(3'-dimethylaminobutyl - 1' - amino) - quinoline. In this manner the hydrobromide of 6-hydroxy-8 - (3'- dimethylaminobutyl-1'-amino) - quinoline is obtained in the form of a red yellow crystal powder melting at 127–128° C.

*Example 8.*—20 grams of 6-methoxy-8-(4'-hydroxy - butyl - 2' - amino) - quinoline (viscous, weakly colored oil boiling at 190–210° C. under 2 mm. pressure, hydrochloride melting at 194° C.) are heated with 100 ccs. of hydrobromic acid (spec. grav. 1.7) for one hour to 120–130° C. The mixture is then evaporated under reduced pressure, and heated with 200 ccs. of saturated methyl alcoholic dimethylamine solution for some time in an autoclave to 100° C. The content of the autoclave is evaporated to dryness under reduced pressure, the residue treated for a short time with steam after having been treated with alkali, and dissolved in dilute hydrochloric acid. After the addition of sodium acetate until the reaction which is acid to Congo red has disappeared the solution is several times extracted with ether. The aqueous solution is then treated with sodium carbonate until the reaction is alkaline, extracted with methylene chloride and the methylene chloride solution evaporated. From the residue the 6-hydroxy-8-(4'-dimethylaminobutyl-2'-amino)-quinoline described in Example 1 is obtained.

*Example 9.*—25 grams of 4-amino-5-[methyl-(3' - dimethyl - amino - 2'.2' - dimethylpropyl) - amino]-1-hydroxy-benzene are dissolved in 50 ccs. of concentrated hydrochloric acid and 8.5 grams of paraldehyde are slowly added drop by drop during 10 hours at 90–95° C., while stirring. After the reaction is complete the solution is diluted with water, rendered alkaline with caustic soda solution and filtered. The alkaline solution is neutralized with dilute acetic acid until the reaction is weakly alkaline and repeatedly extracted with methylene chloride. After the solvent has evaporated the solution is subjected to fractional distillation. The 2-methyl-6-hydroxy-8-[methyl-(3' - dimethylamino - 2'.2' - dimethylpropyl) -amino]-quinoline is obtained as a weakly colored, viscous oil boiling at 220–230° C. under 1 mm. pressure. It solidifies when cold.

I claim:

1. 6-hydroxy-8-amino-quinolines in which the nuclear 8-amino group is connected with an amino group of aliphatic character by an aliphatic chain of three carbon atoms, which compounds are in the form of their salts with mineral acids soluble in water.

2. 6-hydroxy-8-amino-quinolines in which the nuclear 8-amino group is connected with a dialkylamino group by an aliphatic chain of three carbon atoms, which compounds are in the form of their salts with mineral acids soluble water.

3. 6-hydroxy-8 - [delta - diethylamino - butyl-($\beta$)-amino]-quinoline, which compound is in the form of its salts with mineral acids soluble in water.

4. 6-hydroxy-8-(4'-dimethylamino - butyl - 2'-amino)-quinoline, which compound is in the form of its salts with mineral acids soluble in water.

WALTER KIKUTH.